(12) United States Patent
Inoue et al.

(10) Patent No.: US 6,334,274 B1
(45) Date of Patent: Jan. 1, 2002

(54) **METHOD OF SAWDUST-BASED CULTIVATION SHITAKE (*CORTINELLUS SHITAKE*)**

(75) Inventors: Sadayuki Inoue; Sumio Ayusawa; Katsumasa Eda, all of Mibu-machi (JP)

(73) Assignee: Kabushiki Kaisha Hokken, Tochigi (JP)

( * ) Notice: Subject to any disclaimer, the term of this patent is extended or adjusted under 35 U.S.C. 154(b) by 0 days.

(21) Appl. No.: 09/372,670

(22) Filed: Aug. 12, 1999

(51) Int. Cl.[7] .................................................. A01G 1/04
(52) U.S. Cl. ........................................ 47/1.1; 435/254.1
(58) Field of Search ............................ 47/1.1, 58.1, 60; 435/254.1

(56) References Cited

U.S. PATENT DOCUMENTS

| | | | | |
|---|---|---|---|---|
| 3,828,470 A | * | 8/1974 | Stoller | 47/1.1 |
| 3,996,038 A | * | 12/1976 | Toth et al. | 71/5 |
| 4,083,144 A | * | 4/1978 | Fuzisawa et al. | 47/1.1 |
| 4,127,965 A | * | 12/1978 | Mee | 47/1.1 |
| 4,674,228 A | * | 6/1987 | Murata et al. | 47/1.1 |
| 4,987,698 A | * | 1/1991 | Tan | 47/1.1 |
| 5,123,203 A | * | 6/1992 | Hiromoto | 47/1.1 |
| 5,370,714 A | * | 12/1994 | Ogawa et al. | 47/1.1 |
| 6,041,544 A | * | 3/2000 | Kananen et al. | 47/1.1 |

FOREIGN PATENT DOCUMENTS

JP     271913     * 10/1998     ................... 47/1.1

* cited by examiner

*Primary Examiner*—Charles T. Jordan
*Assistant Examiner*—Judith A. Nelson
(74) *Attorney, Agent, or Firm*—Wenderoth, Lind & Ponack, L.L.P.

(57) ABSTRACT

A method of sawdust-based cultivation of Shiitake (Cortinellus Shiitake) in which a number of cultivated primordiums are decreased simply by elevating temporarily a temperature into a zone between 20 degree C. and 40 degree C. during/between a cultivation step and a growing step, thus adjusting a number of grown mushroom fruiting bodies.

6 Claims, No Drawings

METHOD OF SAWDUST-BASED CULTIVATION SHITAKE (*CORTINELLUS SHIITAKE*)

TECHNICAL FIELD

This Invention relates to a sawdust-based cultivation of Shiitake, and more particularly, to a method of sawdust-based cultivating Shiitake mushroom (Cortinellus Shiitake) for continuously growing Shiitake mushrooms having a high quality.

BACKGROUND OF THE INVENTION

In a sawdust-based cultivation of Shiitake mushroom (Cortinellus Shiitake), fruiting of a brown tonica on a mycelial tunicat of a cultivation bed and that of a primordium are indispensable.

There are three methods for selecting the time for carrying out fruiting of a tonica and of a primordium in the controlled cultivation of Shiitake mushrooms.

The first method is that fruiting of a tonica and of a primordium is carried out in a sawdust-based substrate in a culture container at a temperature zone around 20 degree. C., a culture step is over when the primordium increases in a considerable number which is within about 3 or 4 months, and the sawdust-based substrate is taken out of the culture container and exposed to air in order to lower the temperature into the zone between 10 degree C. and 16 degree C., thus giving a low temperature excitement to shift into a growing step.

According to this method, a primordium begins to be activated by the low temperature excitement, which has sprouted a first mushroom after 3 or 4 days, grown for 7 and 17 days, and mushroom fruiting bodies are harvested.

In most cases, a growth on and after the second mushroom fruiting is induced by a submersion excitement A general tendency of number and yield of the mushrooms grown by the first to fourth methods, using "Hokken No.600" (Improvement Registration No. 1791) for a sawdust-based substrate, are shown in the following table.

TABLE 1

| Frequency | Ratio of the growth number to yield by the growth frequency | |
|---|---|---|
| | growth number | growth frequency |
| No. 1 | 60% | 50% |
| 2 | 6 | 10 |
| 3 | 25 | 30 |
| 4 | 10 | 10 |
| Total | 100 | 100 |

As shown in the specification of Patent Publication No.99726/1981 (not-examined), the second method is that a sawdust-based substrate is taken out of a culture container at an early stage of a culture step, a plurality of the sawdust-based substrates are disposed on a plane, keeping in touch with each other, and they are cultivated for 2.5–3 months under a temperature zone between 15 degree C. and 20 degree C. and under water sprinkling.

subsequently, the sawdust-based substrates are taken out of the plane at an early stage of the culture and are exposed to air in order to promote reproduction of the sawdust-based substrates and the reproduced neighboring sawdust-based substrates are brought into contact with each other in 10–15 days.

A brown tonica is gradually formed on a surface of the sawdust-based substrate which is exposed to air.

An excitement is given to the sawdust-based substrates at a temperature zone between 15 degree C. and 25 degree C. at a final stage of cultivation in order to promote growing of Shiitake mushrooms.

As shown in the specification of Patent Publication No.46167/1990 (not-examined), the third method in characterized in that a sawdust-based substrate taken out of a culture container is cultivated in a closed space at a temperature zone between 15 degree C. and 28 degree C. under saturated or almost saturated state of humidity to form a mycelical tunicat of a cultivation bed, and subsequently cultivation is carried out while sprinkling water on the saw-dust-based substrate to form a hardened and brown mycelial tunicat of a cultivation bed.

According to a method described in the specification of Patent Publication No.17636/1996 (not-examined), water-sprinkling is carried out continuously for a period between 1 week and 1 month to form a brown tonica more than 95% on an outer layer of a sawdust-based substrate which is maintained for 1 or 2 months at a temperature zone between 18 degree C. and 28 degree C. with water being sprinkled moderately.

There are many drawbacks to the prior methods of cultivating a sawdust-based substrate including Shiitake mushroom (Cortinellus Shiitake) for continuous growing of Shiitake mushrooms.

In the aforementioned second and third methods, the sawdust-based substrate having still a white surface in taken out of the culture container at an early stage of a culture step, and subjected to cultivation, while exposing the sawdust-based substrate to air, thus promoting formation of a brown mycelial tunicat of a cultivation bed and also formation of substrate.

According to the prior method wherein cultivation is continued, while a surface of a substrate being exposed to air, a brown layer is formed at a saturated temperature by sprinkling much water, but formation is very slow so that a cultivation period after taking out the substrate out of a culture container to shift into a growing step is extended, thus increasing great expenses and labor to maintain a special environmental condition.

In addition, a substrate is formed slowly and little by little by these methods so that there is a tendency that a mushroom sprouts sporadically for a long time so that a total cultivation time is extended for about 11 or 12 months.

As described in the foregoing paragraph, one of the biggest drawbacks to the prior methods is that mushrooms grow into inexpensive small ones which are closely located to come into contact with each other and are likely deformed.

SUMMARY OF THE INVENTION

A primary object of this invention is to provide an improved method of cultivating fungi including Shiitake mushroom (Cortinellus Shiitake) for continuous growing of mushrooms having a high quality.

Another object of this invention is to provide a method of cultivating fungi including Shiitake mushroom (Cortinellus Shiitake) whereby a number of Shiitake spawn are cultured in a culture container, and subsequently the temperature is temporarily elevated into a desired zone in order to decrease the number of Shiitake spawn in a breeding step of the mushroom to a growing step and also to adjust the sprouted Shiitake spawn.

Another object of this invention is to provide a method of cultivating fungi including Shiitake mushroom (Cortinellus Shiitake) whereby a number of the Shiitake substrates can be surely decreased by maintaining a temperature zone between 25 degree C. and 35 degree C. for more than 3 days.

Another object of this invention is to provide a method of cultivating fungi including Shiitake mush-room (Cortinellus Shiitake) whereby a brown spawn layer is formed on a surface of the substrate to finish cultivation in a short period of 3–4 months.

Another object of thin invention is to provide a method of cultivating fungi including Shiitake mushroom (Cortinellus Shiitake) whereby a temperature control of cultivating fungi and growing of mushroom can be carried out efficiently in a short period of time.

Another object of this invention is to provide a method of cultivating fungi including Shiitake mushroom (Cortinellus Shiitake) whereby a space wide enough for growing Shiitake mushrooms can be provided between the Shiitake mushrooms and an inner wall of a culture container.

Another object of this invention is to provide a method of cultivating fungi including Shiitake mushroom (Cortinellus Shiitake) whereby water sprinkling can be easily carried out immediately after a substrate is taken out of a culture container.

Another object of this invention is to provide a method of cultivating fungi including Shiitake (Cortinellus Shiitake) whereby water sprinkling can be carried out intermittently.

Still another object of this invention is to provide a method of cultivating fungi including Shiitake mushroom (Cortinellus Shiitake) whereby a temperature can be controlled within a zone between 20 degree C. and 40 degree C. in order to maintain an average temperature into a zone between 25 degree C. and 35 degree C.

DETAILED DESCRIPTION OF THE PREFERRED EMBODIMENT

This invention provides an improved method of cultivating fungi including Shiitake mushroom (Cortinellus Shiitake) for continuous growing of mushroom having a high quality which comprises a step of mixing saw-duct of a broad-leaved tree and wheat bran into a filtered culture container, adding water into a mixture, steam-sterilizing the mixture, inoculating the mixture with the mushroom spawn and cultivating at the desired temperatures for the desired days to form many substrates, placing test batches on the substrates, elevating the temperature temporarily into a desired range in order to decrease the number of Shiitake spawn in a breeding step of the mushroom to a growing step and also to adjust the sprouted Shiitake spawn.

Other features, advantages, and objects of this invention will become apparent with reference to the following description and accompanying drawing.

DETAILED DESCRIPTION OF A PREFERRED EMBODIMENT

Saw-dust of a broad-leaved tree and wheat bran were mixed in the ratio of 9 to 1, into which water was added to make a mixture having a water content of 65%, and 1.2 kg. of the mixture was filled into a filtered culture container of polypropylene plastic.

After the bags of substrate have been steam-sterilized at 100 degree C. for 5 hours, they were inoculated with the mushroom spawn of [Hokken No. 60] and cultivated at 20 degree C.

Usually, this spieces finishes forming a brown spawn layer on a surface of a substrate and that of a substrate in a breeding period between 70–90 days.

Breeding, however, was carried out as long as 110 days in order to form many substrates for confirming an effect of this invention.

25 test batches were placed on the substrate at the temperatures of 20 degree C., 23 degree C., 25 degree C., 30 degree C. and 35 degree C. for 3 days, 5 days, 10 days, 20 days and 30 days respectively, they were subsequently taken out of the culture container and exposed to air, and were controlled in a growing room at 15 degree C. to observe the first growing of Shiitake mushrooms.

In the temperature zone over 35 degree C., the Shiitake mushrooms weakened so that an experiment was carried out at a temperature under 35 degree C. which is shown in TABLE 11.

As a comparative example, a comparative batch was placed immediately after having been bred at 20 degree C. in the breeding period of 110 days.

TABLE 11

| | Ordinary cultivation | | Growth number of adjusted spawn | | Adjusted result | |
|---|---|---|---|---|---|---|
| | temp. (deg. C.) | day | temp. (deg. C.) | day | number of spawn | number of sprout |
| Compara. example | 20 | 110 | — | — | 140 | 43 |
| Experi. example | | | | | | |
| No. 1 | 20 | 110 | 20 | 3 | 139 | 42 |
| 2 | 20 | 110 | 20 | 5 | 140 | 41 |
| 3 | 20 | 110 | 20 | 10 | 139 | 41 |
| 4 | 20 | 110 | 20 | 20 | 139 | 40 |
| 5 | 20 | 110 | 20 | 30 | 140 | 42 |
| 6 | 20 | 110 | 23 | 3 | 150 | 45 |
| 7 | 20 | 110 | 23 | 5 | 160 | 47 |
| 8 | 20 | 110 | 23 | 10 | 170 | 48 |
| 9 | 20 | 110 | 23 | 20 | 155 | 41 |
| 10 | 20 | 110 | 23 | 30 | 150 | 40 |
| 11 | 20 | 110 | 25 | 3 | 130 | 38 |
| 12 | 20 | 110 | 25 | 5 | 120 | 33 |
| 13 | 20 | 110 | 25 | 10 | 105 | 30 |
| 14 | 20 | 100 | 25 | 20 | 95 | 30 |
| 15 | 20 | 110 | 25 | 30 | 80 | 25 |
| 16 | 20 | 110 | 30 | 3 | 70 | 27 |
| 17 | 20 | 110 | 30 | 5 | 50 | 18 |
| 18 | 20 | 110 | 30 | 10 | 42 | 15 |
| 19 | 20 | 110 | 30 | 20 | 39 | 10 |
| 20 | 20 | 110 | 30 | 30 | 35 | 8 |
| 21 | 20 | 110 | 35 | 3 | 40 | 14 |
| 22 | 20 | 110 | 35 | 5 | 30 | 11 |
| 23 | 20 | 110 | 35 | 10 | 25 | 7 |
| 24 | 20 | 110 | 35 | 20 | 10 | 3 |
| 25 | 20 | 110 | 35 | 30 | 8 | 2 |

A number of primordium were counted at a batch on a part of the sawdust-based substrate when the substrate was exposed to air, and a number of sprouting fruiting body were shown in TABLE 11.

The number of primordium did not decrease at the temperatures of 20 degree C. and 23 degree C., the number of primordium begins to decrease when the temperature rises over 25 degree C, and a clear substantial decrease of primordium has been confirmed when the temperature rises at 30 degree C. and 35 degree C.

It has been found that a number of primordium can be adjusted in proportion to decrease of a primordium to control a number of sprouting fruiting body, thus enabling to control a first concentrated sprouting as well.

According to this method, it has been learned that the higher the controlled temperature, the shorter a number of primordium and of sprouting fruiting body can be adjusted, but it should be noticed that there is a danger of weakening Shiitake spawn in a temperature zone over 35 degree C.

In a controlled test carried out in a temperature zone between 25 degree C. and 35 degree C. in a culture container including a plurality of sawdust-based cultivation beds which are arranged with a space to an inner wall of the culture container, the number of primordium and of sprouting fruiting bodies decrease as in the foregoing test, in which Shiitake spawn has grown into mushrooms having a water content of 90–92%.

In accordance with this invention, it has been confirmed that mushrooms, each having a moderate water content between 89–90% and a better shape, have grown from the sawdust-based substrates which are a little lighter than the conventional sawdust-based substrates.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method of sawdust-based cultivating Shiitake (Cortinellus Shiitake) comprising the steps of:

mixing saw-dust of a broad-leaved tree and wheat bran;

adding water into the mixed saw-dust and wheat bran to make a mixture;

introducing said mixture into a filtered culture container of polypropylene plastic to make a substrate;

steam-sterilizing said culture container and the mixture;

inoculating said sawdust-based substrate with mushroom spawn;

cultivating said substrate at room temperature to form a brown spawn layer on a surface of said substrate, whereby mushroom fruiting bodies are formed; and harvesting said fruiting bodies.

2. A method of sawdust-based cultivating Shiitake as claimed in claim 1, wherein a temperature is elevated temporarily before or after a day from shifting into a cultivation step to a growing step into a temperature zone between 20 degree C. and 40 degree C. to decrease a number of primordiums and also to adjust a number of sprouting fruiting bodies.

3. A method of sawdust-based cultivating Shiitake as claimed in claim 2, wherein a plurality of sawdust-based cultivation beds are arranged spaced apart from an inner wall of the culture container.

4. A method of sawdust-based cultivating Shiitake as claimed in claim 2, wherein a plurality of sawdust-based cultivation beds are taken out of the culture container to expose said sawdust-based cultivation beds to air, and water is sprinkled on said sawdust-based cultivation beds.

5. A method of sawdust-based cultivating Shiitake as claimed in claim 4, wherein said water sprinkling is carried out intermittently.

6. A method of sawdust-based cultivating Shiitake as claimed in any one of claims 1, 2, 3 or 4, wherein a temperature change control is carried out within a temperature range between 20° C. to 40° C., and an average temperature is maintained in a range between 25° C. to 35° C.

\* \* \* \* \*